United States Patent [19]
Voorhees et al.

[11] Patent Number: 5,954,915
[45] Date of Patent: Sep. 21, 1999

[54] SURFACE FINISHING APPARATUS

[75] Inventors: Theodore Voorhees, Anderson; William W. Bollinger; Paul L. McDowell, both of Redding, all of Calif.

[73] Assignee: Voorwood Company, Anderson, Calif.

[21] Appl. No.: 08/653,603

[22] Filed: May 24, 1996

[51] Int. Cl.⁶ ...................................................... B32B 35/00
[52] U.S. Cl. ........................ 156/362; 156/350; 156/446; 156/538; 156/540; 144/129; 414/433
[58] Field of Search ..................................... 156/348, 350, 156/362, 446, 447, 468, 483, 499, 540, 538, 539; 144/114.1, 129; 198/411, 415, 787; 414/433, 757, 777

[56] References Cited

U.S. PATENT DOCUMENTS

| | | |
|---|---|---|
| 1,282,508 | 10/1918 | Wern . |
| 3,584,665 | 6/1971 | Gemmani . |
| 3,636,998 | 1/1972 | Sarrail . |
| 3,718,517 | 2/1973 | Berg . |
| 3,732,908 | 5/1973 | White . |
| 3,733,237 | 5/1973 | Wolff . |
| 3,738,403 | 6/1973 | Schwoch et al. . |
| 3,739,826 | 6/1973 | Schell . |
| 3,757,974 | 9/1973 | Steinbach . |
| 3,797,543 | 3/1974 | Schell . |
| 3,916,965 | 11/1975 | Attridge et al. . |
| 4,058,151 | 11/1977 | Yonezu . |
| 4,192,363 | 3/1980 | Casadei . |
| 4,281,694 | 8/1981 | Gorman . |
| 4,306,598 | 12/1981 | Peot . |
| 4,373,984 | 2/1983 | Hawkins . |
| 4,465,409 | 8/1984 | Buschbom et al. . |
| 4,486,261 | 12/1984 | Koller et al. . |
| 4,512,380 | 4/1985 | Schmidt . |
| 4,533,033 | 8/1985 | Van Wegen . |
| 4,555,297 | 11/1985 | Andrus et al. . |
| 4,644,985 | 2/1987 | Weaver . |
| 4,648,325 | 3/1987 | Gutekunst et al. . |
| 4,696,714 | 9/1987 | Voorhees . |
| 4,750,966 | 6/1988 | Koller . |
| 4,870,787 | 10/1989 | Voohrees . |
| 5,246,096 | 9/1993 | Terpstra ............................... 198/787 X |
| 5,246,533 | 9/1993 | Mochizuki . |

OTHER PUBLICATIONS

Voorwood "Model L177 Single Edge Shaper/Foiler", Mar. 1987.
Voorwood "Instant Finish System", Apr. 1995.

*Primary Examiner*—Curtis Mayes
*Attorney, Agent, or Firm*—John P. O'Banion

[57] ABSTRACT

A surface finishing apparatus for finishing the edge surfaces of fiberboards or like substrates. A pair of axially convergent drive wheels impart rotational and radial motion to a board and pushes the board against a foiling head or other surface finishing hardware. The foiling wheel is pushed by a pneumatic cylinder towards the board. An air clamp holds the board down against the drive wheels during operation. A speed indexer computer controls the rotation of the axially convergent drive wheels in inverse relationship to the rotational speed of the foiling head. In an alternative embodiment, a pair of angled hold-down wheels are used to hold the board against the drive wheels.

13 Claims, 9 Drawing Sheets

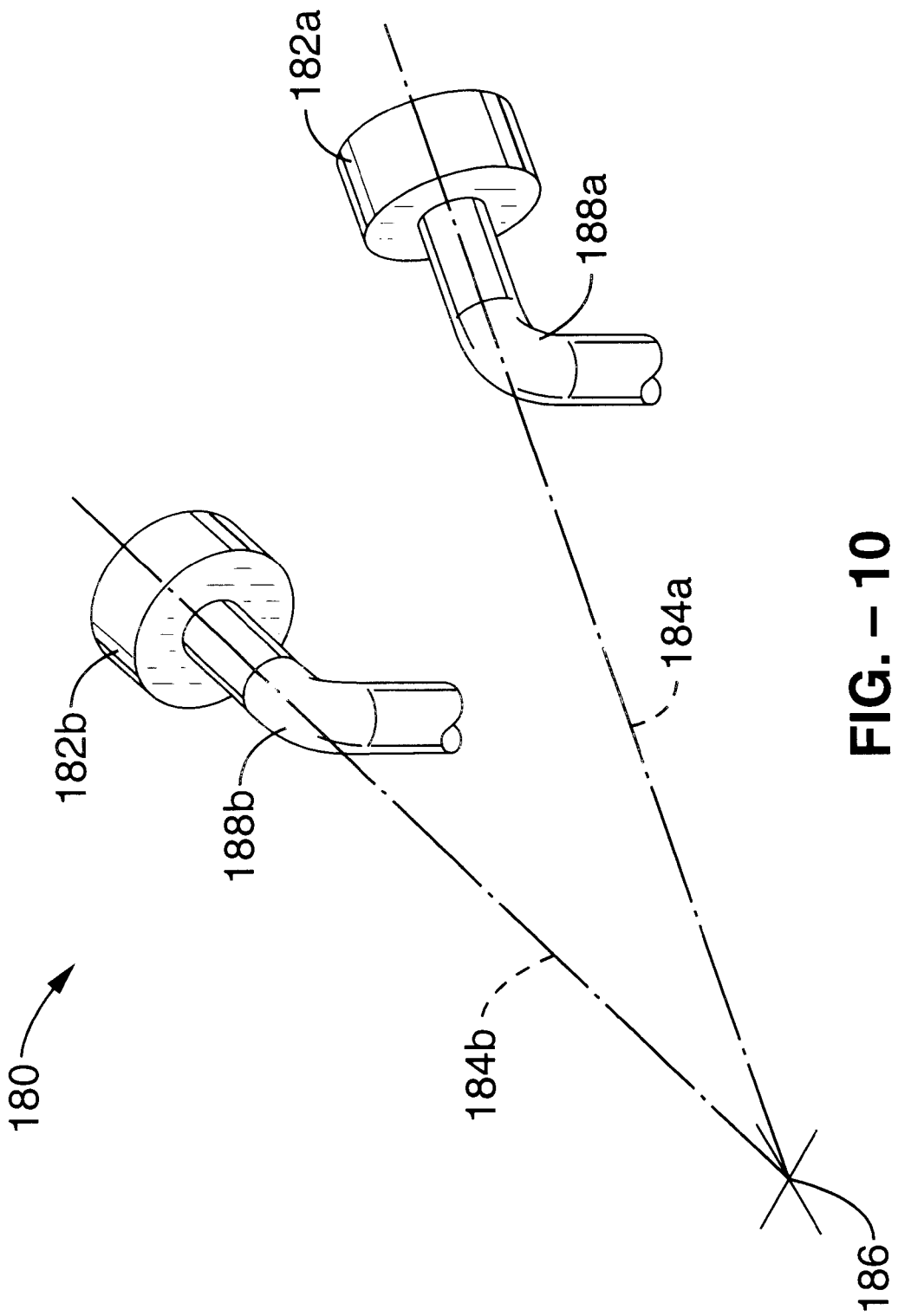

SURFACE FINISHING APPARATUS

BACKGROUND OF THE INVENTION

1. Field of the Invention

This invention pertains generally to devices and methods for finishing the surfaces of wood and fiberboard items, and more particularly to an apparatus and method for applying decorative coating from a foil onto curvilinear and irregular-shaped edges of wood pieces without the need for a template or other guide structure.

2. Description of the Background Art

As dimensional lumber is becoming increasingly scarce and expensive, much furniture is now made from board material comprising pressed and bonded sawdust, wood chips or wood fibers, such as reconstituted fiberboard, chip board and medium density fiberboards or OMF. In its natural state, MDF and other fiberboard materials are somewhat unattractive and do not provide finished surfaces suitable for use as furniture or for decorative applications. In order to make MDF and other fiberboard look more like the dimensional lumber it replaces, it is desirable to cover the board surfaces with a decorative film which simulates a wood grain finish. This is carried out by various surface finishing treatments to improve the physical appearance of the MDF. A frequently used surface finishing treatment process is foiling, wherein a wood grain pattern or other decorative pattern is painted onto a roll of plastic carrier film or tape, and then, using heat and pressure, the decorative paint pattern is transferred from the film to the MDF surface. The foil typically comprises a carrier film such as MYLAR® polyester, a heat release adhesive adjacent to or on the carrier film, a layer of decorative paint or pigment placed on the heat release adhesive, and a heat activated adhesive on top of the decorative paint layer. When the foil is heated and pressed against a substrate such as the edge of a board, the heat activated adhesive sticks to the substrate while the heat release adhesive is released or disengages from the carrier film, thus providing for transfer of the decorative paint layer to the board from the film.

In the past, edge foiling of rectangular boards has been carried out in four separate passes by various types of machines. More recently, single pass edge foiling of all four edges of rectangular boards, as well as contoured edges of non-rectangular boards, has been achieved through use of a template which exactly matches the shape of the edges of the board which is to be foiled. The template generally has a guide structure associated with its edges, such as a chain which can be driven by a sprocket. The template pattern serves to hold the board against the foiling wheel from which the decorative foil is transferred to the board edge.

Several drawbacks are associated with conventional edge foiling devices and other surface finishing devices and methods which require templates. For example, surface finishing machines generally require that each board have its own template with a precise edge pattern that matches the board. The template patterns are costly to build, maintain and store, and use of template edge foiling devices requires that the board have exactly the same shape as the template pattern, or the foil will not be applied properly to the board edges. In order to carry out edge foiling of a different-shaped board on the foiling device, there is necessary delay because the previous template must removed from the device and a new template installed thereon which matches the edge contours of the new, different-shaped board to be finished.

Another important problem present in conventional edge foiling machines is that the boards are moved with a constant speed in relation to the chain on the template, rather than at the appropriate or optimum speed for the particular edge or peripheral contour of the board which is being foiled. This results in a peripheral speed which varies with the shape of the board edges and causes uneven application of the decorative coating from the foil onto the board edges. A certain amount of heat and pressure for a given amount of time is required for proper foiling. Conventional edge foiling machines which vary the peripheral speed of the board tend to apply heat and pressure from the foiling wheel onto the board for too much time in the straight sections of edges, and for too little time in the comers and curved sections of the edges, thus resulting in uneven application and poor adhesion of the foil to board edges.

Yet another deficiency in conventional edge surface finishing devices is that scratching or marring of previously top-finished and/or bottom finished board surfaces may occur during edge finishing due to the manner in which the machines hold the boards during the edge finishing operation.

Accordingly, there is a need for a surface finishing apparatus for MDJF boards and the like which does not require the use of templates or guide structures, which can be used for edge-foiling or edge finishing of boards having irregular and curvilinear edge structures, which can consecutively carry out edge-finishing on different shaped boards without requiring exchange of templates or other machine adjustment between boards, and which does not damage previously finished top and bottom surfaces. The present invention satisfies these needs, as well as others, and generally overcomes the deficiencies found in conventional foiling machines.

SUMMARY OF THE INVENTION

The present invention is an apparatus and method for surface finishing boards or other workpieces of varying configurations without the use of templates. In its most general terms, the invention comprises (i) surface finishing means, (ii) drive means for rotating a workpiece and providing radial force to a workpiece in the direction of the surface finishing means, (iii) means for pushing, moving or directing the surface finishing means towards the drive means, (iv) hold-down means for holding a workpiece against the drive means and retaining the workpiece in place during surface finishing, and (v) speed follower means for controlling or adjusting the speed of the drive means according to the speed or rate of operation of the surface finishing means. The surface finishing means, drive means, hold-down means and speed follower means are all preferably associated with a base or a work platform which includes a ball-bearing or air cushion table for flat workpieces.

By way of example and not of limitation, the surface finishing means preferably comprises a foiling or foil transfer assembly having a foiling head or wheel which is rotatably driven by a DC drive or other rotational power source, a swivel-mounted oven positioned to heat the foiling head, an unwind motor for a spool of transfer foil, and tensioning means in the form of a jockey arm and roller. The foiling assembly is slidably or movably mounted on the base. A rewind arm and a uptake motor are generally included on the base for receiving spent or used foil from the foil transfer assembly. A plurality of rollers or wheels are provided to direct foil from the spool to the foiling head and to the rewind arm and uptake motor, and to control tension of the foil. Other types of paint or coating application assemblies, surface planers, sanders, buffers, polishers, or other surface finishing or surface treating means may also be utilized with the invention as alternatives to the foil transfer assembly.

The drive means for simultaneously providing rotational and radial force to a workpiece preferably comprises a pair of converging axis drive wheels or feed rollers which are rotatably mounted on the base and positioned to frictionally engage a workpiece along its bottom surface in order to rotationally and radially drive or move the workpiece. The axially convergent drive wheels are canted, tilted or otherwise leaning towards each other such that a point of convergence exists for the rotational axes of the drive wheels. In one embodiment of the drive means, the rotational axes of the drive wheels are substantially perpendicular to the plane of the board or workpiece being finished, while in a second embodiment of the drive means the rotational axes of the drive wheels are substantially parallel with the plane of the board or workpiece being finished. Both embodiments impart rotational and radial force to a workpiece due to the angled or canted relationship of the drive wheels. The drive wheels preferably have a tapered, frusto-conical structure and configuration and have traction generating surfaces for engaging a workpiece. The point of convergence of the rotational axes of the drive wheels can be adjusted by adjusting the cant or tilt of the drive wheels over an angle of arc in order to vary the amount of rotational and/or radial force applied to the workpiece. The drive wheels are preferably mounted on spindles which are mechanically interfaced with a rotational power source such as a feed drive stepper motor.

The hold-down means preferably comprises an air clamp or air bearing assembly which is designed so that a flow of air maintains pressure on the workpiece and holds the workpiece against the drive wheels without mechanical contact between the air clamp and the workpiece. One or more holes in the air clamp allow some of the air to escape axially, relative to the clamp's movement. This air blowing against the substrate holds the air clamp slightly away from the substrate, thus protecting the delicate surface treatment of the substrate from marring. The air clamp may include a skirt to create or define a plenum to better control air flow. The air clamp position is adjustable in relation to the tapered drive disks. The hold-down means may alternatively comprise a pair of canted upper hold-down disks which are positioned opposite the drive disks of the drive means and which hold the workpiece in place against the drive disks.

The speed follower means provides for motion control of the apparatus by utilizing an indexer computer or microprocessor, a high-resolution encoder, and a multiple position range selector switch which are linked or interfaced together with the drive means and surface finishing means. The encoder is positioned to monitor rotational speed of the foiling head. The indexer is enabled by a sequence controller computer or microprocessor, for which a speed is set via the range selector switch. The range selector switch changes the value of the band width conversion ratio within a fuzzy logic algorithm tree included within an open control program associated with the indexer. The fuzzy logic algorithm tree uses a conversion ratio along with the clocked speed differential of the encoder to calculate running speed values for the surface finishing means. The running speed of operation of the surface finishing means is inversely related by the indexer to the operating speed of the drive means. Thus, when a foiling head speed exceeds a specific range, the indexer instructs the drive means to slow down.

The means for pushing or directing the surface finishing means towards the drive means preferably comprises a pneumatically actuated sliding platform. The surface finishing means is mounted on the sliding platform and is slidably moved with the sliding platform by a pneumatic cylinder relative to the base and drive means so that the surface finishing means is moved towards the workpiece by the sliding platform while the workpiece is radially forced or moved toward the surface finishing means by the drive means.

The safe operation of the apparatus comprising the present invention is ensured by the sequence controller which interfaces with the components of the surface finishing means so that the drive means, heating oven and/or other components can be turned on only when the foiling head is rotating.

An object of the invention is to provide a surface finishing apparatus which neatly and accurately carries out surface finishing of wood boards or other substrates having curvilinear, irregular and/or contoured edges.

Another object of the invention is to provide a surface finishing apparatus which can finish surfaces of various types of substrates.

Another object of the invention is to provide a surface finishing apparatus which finishes the edges of a top and/or bottom finished piece without marring or damaging the top and/or bottom finished surfaces.

Another object of the invention is to provide a surface finishing apparatus which utilizes a pair of tilted drive wheels of tapered shape for simultaneously imparting rotational and radial force to a workpiece.

Another object of the invention is to provide a surface finishing apparatus which utilizes speed follower control wherein the running speed of the drive wheels is inversely related to the operational speed of the surface finishing.

Another object of the invention is to provide a surface finishing apparatus which has a constant peripheral speed for board edges and thus avoids uneven application of decorative coating to board edges.

Another object of the invention is to provide a surface finishing apparatus which utilizes an air clamp for holding workpieces against the drive wheels.

Another object of the invention is to provide a surface finishing apparatus which may be used for edge foiling of wood boards or other workpieces having irregular, curvilinear and/or contoured edges.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following figures which are for illustrative purposes only:

FIG. 10 is a perspective view of an alternative embodiment drive wheel arrangement in accordance with the invention.

DESCRIPTION OF THE PREFERRED EMBODIMENTS

Referring more specifically to the figures, for illustrative purposes the surface finishing apparatus comprising the present invention is generally shown in FIG. 1 through FIG. 10. It will be appreciated that the apparatus may vary as to configuration and as to details of the parts, and that the method may vary as to the steps and their sequence, without departing from the basic concepts as disclosed herein. The invention is disclosed generally in terms of a foiling apparatus wherein decorative coatings are transferred from a foil by a transfer assembly to the edge surfaces of a wood board or other substrate or workpiece. The preferred embodiment as disclosed herein is particularly well suited for edge foiling of generally flat boards or substrates which have curvilinear or irregularly-shaped edges. It will be readily apparent to those of ordinary skill in the art, however, that the surface finishing apparatus comprising the invention may be used with paint or coating application assemblies, surface planers, sanders, shapers buffers, polishers, or other surface finishing or surface treating means for applying or effecting a finish on the edges, flat surfaces or other surfaces of various types of substrates or workpieces.

Figure 1:
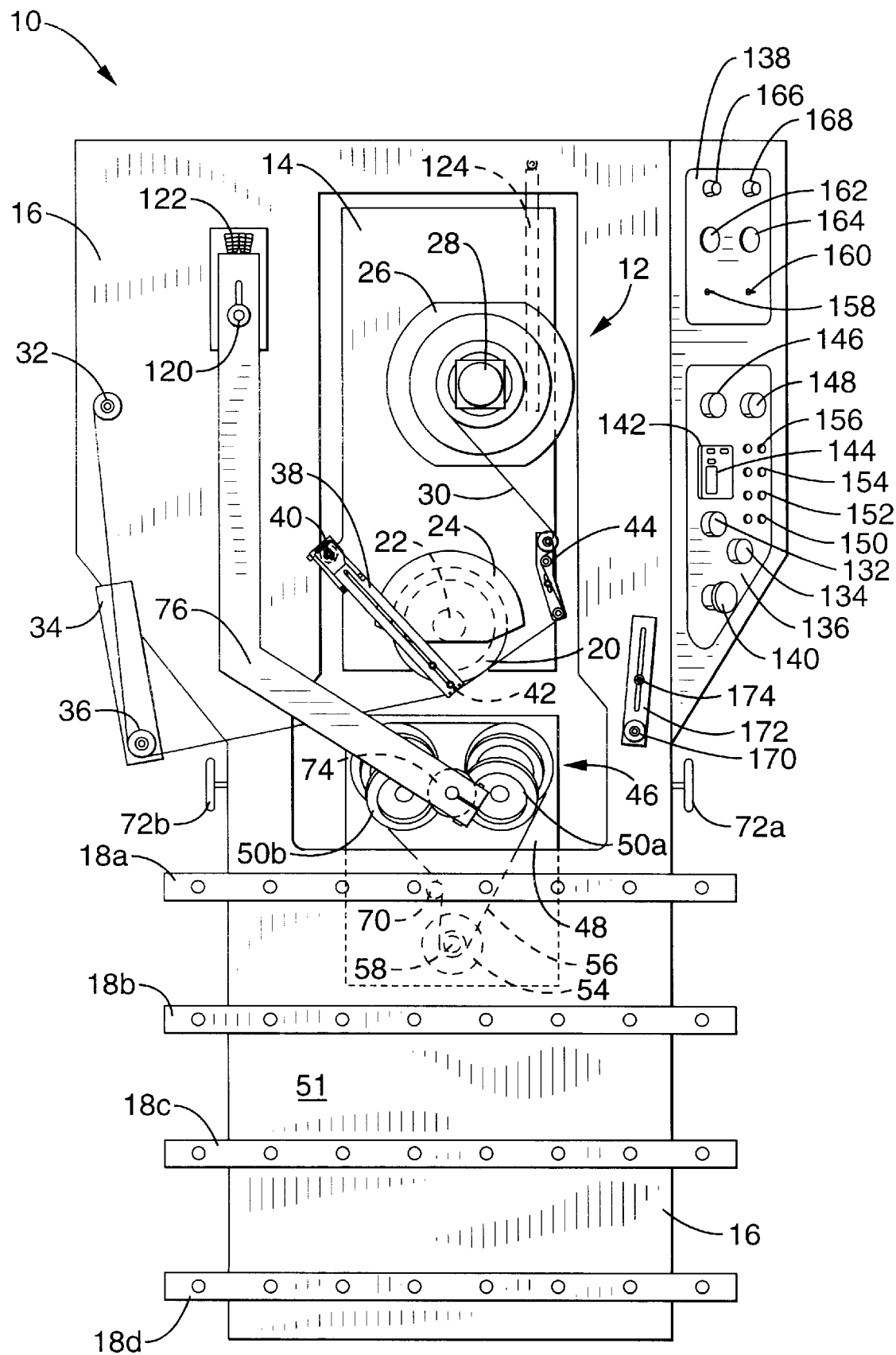
FIG. 1 is a top plan view of a surface finishing apparatus in accordance with the present invention.
Figure 2:
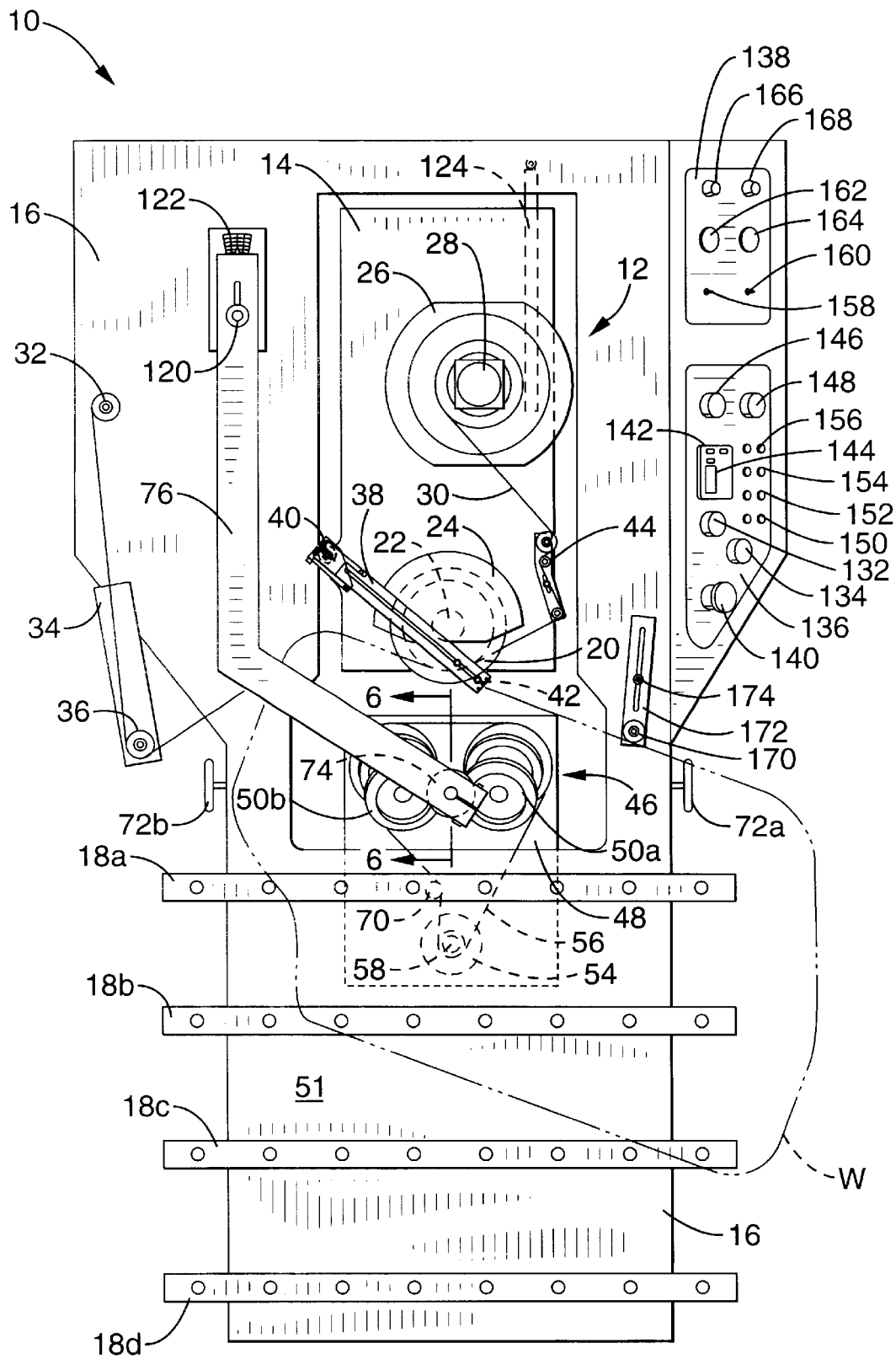
FIG. 2 is a top plan view of the apparatus of FIG. 1 showing a workpiece W in phantom and showing the jockey arm moved to accommodate the workpiece.

Referring first to FIG. 1 and FIG. 2, a surface finishing apparatus 10 in accordance with the present invention is generally shown. The apparatus 10 includes a foiling assembly or foil transfer assembly 12 mounted on a platform or plate 14. Platform 14 is movably or slidably mounted on a base or work table 16 which is conveniently sized and shaped to facilitate use of the invention by an operator. The structure and configuration of base 16 may be varied as desired for different applications of the invention. Ball bearing rows 18a–18d on base 16 provide a low friction surface for accommodating flat boards or substrates which are shown generally as a workpiece W in FIG. 2. Workpiece W is shown as generally flat or planar in shape. The number and configuration of ball bearing rows 18a–18d can be varied as desired to accommodate different sizes and types of workpieces W. An air table (not shown) may be used in place of ball bearing rows 18a–18d to provide a low friction surface on base 16.

Foil transfer assembly 12 generally includes a foiling head or wheel 20 which is rotatably driven by a DC drive or gear motor 22 or other rotational power source such as linear motor, AC motor, DC motor, air motor, servo motor, or other electrical, mechanical or pneumatic means. A one way clutch (not shown) is included on the drive shaft (not shown) connecting drive motor 22 and foiling head 20, which allows foiling head 20 to overrun when necessary to compensate for the shape of workpiece W. A cowl-shaped heater or oven hood 24 for controlling the temperature of foiling head 20 partially encloses foiling head 20, and is swivel mounted on platform 14 so that oven 24 can swing away from foiling head 20 to accommodate oddly-shaped portions of workpiece W, if required. An interchangeable and replaceable spool of transfer foil 26 is mounted on platform 14 via unwind torque motor 28. Spool 26 is unwound to continuously supply a strip of foil 30 to foiling head 20. Heat and pressure are conventionally applied to transfer a heat-activated paint or decorative layer from the foil 30 to the edge of workpiece W. After foiling, the used carrier film from foil 30 is received by a take-up torque motor 32, mounted on base 16. A rewind arm 34 is pivotally mounted on base 16, and includes a pulley or wheel 36. Foil 30, which has been heated during passage by heated foiling head or wheel 20, is allowed to cool as it is passes around pulley 36 on rewind arm 34 before the carrier film is taken up by torque motor 32.

Foil transfer assembly 12 also includes a jockey arm 38 pivotally mounted on plate 14 by a post 40. A roller 42 is provided on jockey arm 38 on the end opposite post 40, and foil 30 passes around roller 42. Jockey arm 38 serves to hold foil 30 against workpiece W and to outfeed foil 30 from workpiece W at an angle or orientation, close to that of the workpiece edge or surface being foiled, and at a sufficient distance such that foil 30 does not wrinkle. Bias means such as a spring (not shown) associated with post 40 serves to spring load jockey arm 38 towards a resting position, shown in FIG. 1, wherein roller 42 is generally adjacent foiling head 20. Preferably, the spring is adjustable by means of a tension adjust collar (not shown) associated with post 40, to control amount of bias against jockey arm 38 as required for particular foiling operations. Jockey arm 38 moves between a resting position shown in FIG. 1 and an extended or tensioned position, shown in FIG. 2, through an angle of arc which may be adjusted as required to accommodate different workpieces. Adjustment of the angle of arc for jockey arm 38 may be carried out with a stop position lock (not shown) associated with post 40, which is positioned and locked in place to increase or reduce the angle of arc through which jockey arm 38 moves. Jockey arm 38 is preferably extensible, and the length of jockey arm 38 may be adjusted for increased or reduced length as necessary for different operations. A guide wheel array 44 is also included with foil transfer assembly 12, and has a plurality of guide wheels which control tension and orientation of foil 30 between spool 26 and foiling head 20.

As described above, foil transfer assembly 12 is merely one of many possible surface finishing means contemplated for use with the present invention. The surface finishing means may alternatively comprise a spray paint applicator or applicators, computer controlled spray paint or ink jet applicators, surface planers, sanders, buffers, polishers, shapers or other surface finishing or surface treating means for applying or effecting a finish on the edges or other surfaces of various types of substrates or workpieces. Additionally, the foil transfer assembly 12 may utilize a larger or smaller foiling wheel or head 20, or may include equipment for ultrasonic or vibratory foiling.

Figure 5:
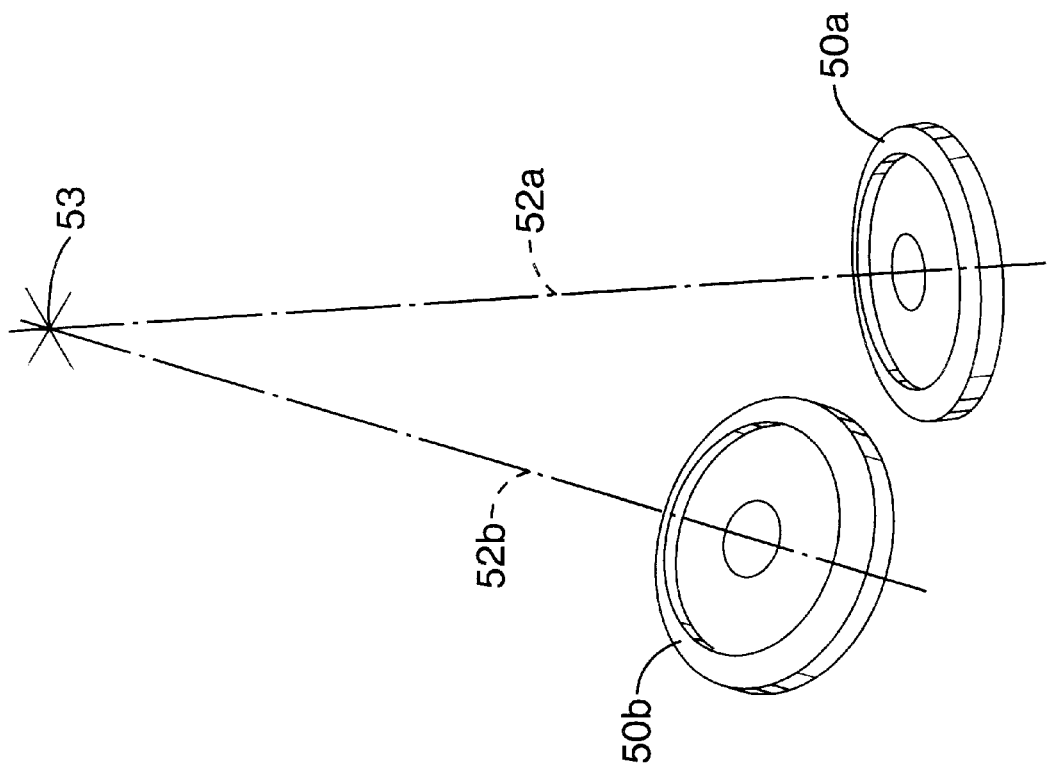
FIG. 5 is a perspective view of the drive wheels of the drive means illustrating the convergence of the rotational axes of the drive wheels.

The surface finishing apparatus 10 includes means for rotating workpiece W relative to the surface finishing means and for driving, directing or moving workpiece W radially towards the surface finishing means. The drive means preferably comprises a feed drive assembly 46 located within a well or recessed area 48 in base 16. Feed drive assembly 46 includes an identical pair of converging axis or axially convergent drive wheels or feed rollers 50a, 50b which extend out of well 48 and above the top surface 51 of base 16. Drive wheels 50a, 50b are positioned in an opposing arrangement or relationship and are generally canted, tilted or otherwise angled relative to each other. Referring more particularly to FIG. 5, as well as to FIG. 1 through FIG. 4 and FIG. 7 and FIG. 9, the rotational axes 52a, 52b of drive wheels 50a, 50b respectively converge at a point 53 above the drive wheels 50a, 50b and at a distance from drive wheels 50a, 50b which can be adjusted by controlling the angle of cant or tilt of drive wheels 50a, 50b, as discussed further below. In the embodiment of the drive means shown in FIG. 1 through FIG. 5 and in FIG. 7 and FIG. 9, drive wheels 50a, 50b have rotational axes 52a, 52b which are substantially parallel to the rotational axis (not shown) of foiling head 20 and which are substantially canted relative to planar workpiece W and the flat bottom edge of workpiece W. It is the angular relationship of drive wheels 50a, 50b relative to each other, and their convergent rotational axes 52a, 52b that generate the drive action on workpiece W which imparts or provides rotational motion to workpiece W as well as provides a radial force to workpiece W in the direction of foil transfer assembly 12 and foiling head 20, as discussed further below. Drive wheels 50a, 50b may alternatively be positioned such that their rotational axes are not substantially parallel to the rotational axis of foiling head 20 and which are substantially parallel to the planar surfaces of workpiece W, as will be made more clear below in the description of an alternative embodiment of the drive means. In the embodiment of the drive means shown in FIG. 1 through FIG. 5 and FIG. 7 and FIG. 9, drive wheels 50a, 50b preferably are slightly canted or tilted away from the surface finishing means, as well as canted towards each other.

Drive wheels 50a, 50b are rotationally powered by a stepper motor 54 which is mechanically interfaced with drive wheels 50a, 50b, preferably by a timing belt 56. Stepper motor 54 may alternatively comprise a linear motor, AC motor, DC motor, air motor, servo motor, or other electrical, mechanical or pneumatic means for imparting rotational power to drive wheels 50a, 50b. Stepper motor 54 alternatively may be interfaced with drive wheels 50a, 50b by a chain, gear arrangement or other standard mechanical interface. Drive wheels 50a, 50b generally rotate in the same direction under the action of timing belt 56.

Figure 3:
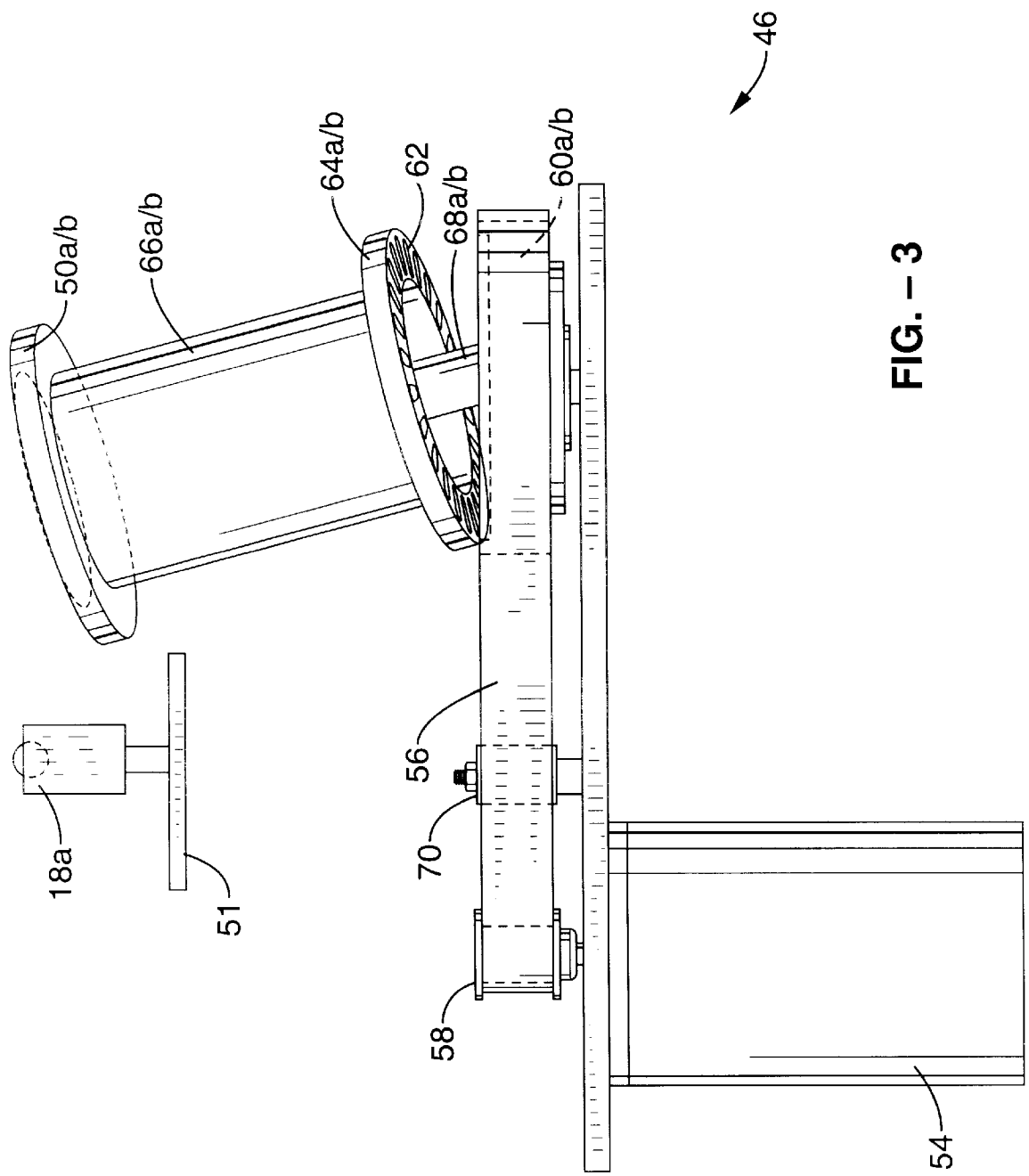
FIG. 3 is a side elevation view of the drive means of the invention, showing a portion of the base and a ball bearing row.

Axially convergent or canted drive wheels 50a, 50b generally have axes of rotation 52a, 52b, respectively, which are not parallel to or aligned with each other, but which are canted relative to each other so that the rotational axes 52a, 52b meet or converge at convergence point 53, as described above. Referring more particularly to FIG. 3, as well as to FIG. 1, FIG. 2, FIG. 4 and FIG. 5, drive assembly 46 is structured, configured and arranged to impart rotational power to drive wheels 50a, 50b which are angled relative to stepper motor 54 or otherwise not rotationally aligned with stepper motor 54. Preferably, drive assembly 46 includes a timing pulley 58 on stepper motor 54 to power timing belt 56. Timing belt 56 in turn drives a pair of cogged timing pulleys 60a, 60b, which have rotational axes (not shown) that are parallel to or aligned with the rotational axis (not shown) of stepper motor 54. Cogged timing pulleys 60a, 60b include teeth or cogs (not shown) which intermesh with matching teeth or cogs 62 on a pair of cogged wheels 64a, 64b, so that cogged timing pulleys 60a, 60b drive cogged wheels 64a, 64b. Cogged wheels 64a, 64b, which power wheels 50a, 50b, have rotational axes (not shown) that are angled relative to the rotational axes of cogged timing pulleys 60a, 60b and stepper motor 54, but which are coaxial with the rotational axes 52a, 52b of drive wheels 50a, 50b, respectively. The pair of cogged wheels 64a, 64b are connected with drive wheels 50a, 50b by pair of cylinders or tubes 66a, 66b. Drive wheels 50a, 50b are each mounted on angled shafts 68a 68b, together with a corresponding cogged wheel 64a, 64b and cylinder 66a, 66b.

With the above described drive assembly 46, rotational motion fom stepper motor 54 is thus imparted to canted, axially convergent drive wheels 50a, 50b via timing belt 56, the pair cogged timing pulleys 60a, 60b, the pair of cogged wheels 64a, 64b, and the pair of connecting cylinders 66a, 66b. A belt tension adjuster 70 allows control of the tension of timing belt 56. Other arrangements for mechanically interfacing stepper motor 54 with drive wheels 50a, 50b, such as universal joints, frictional contacts, or other cog arrangements will suggest themselves to those skilled in the art. The arrangement for imparting rotational power to drive wheels 50a, 50b as disclosed herein thus should not be considered limiting. Means for adjusting the position of convergence point 53 of rotational axes 52a, 52b, as well as the angle of drive wheels or feed rollers 50a, 50b relative to each other, are included with the invention, and preferably comprise manually operated angle adjustment wheels 72a, 72b (FIG. 1 and FIG. 2) which are mechanically interfaced by standard means with angled shafts 68a, 68b via mounting bases (not shown). Use of the angle adjustment means 72a, 72b allows an operator to control the location of convergence point 53 of rotational axes 52a, 52b of drive wheels 50a, 50b by adjusting the angle of tilt or cant of drive wheels 50a, 50b relative to each other. Angle clamps (not shown) are used to hold or lock the mounting bases (and thus shafts 68a 68b and drive wheels 50a, 50b) at the desired angular adjustment set by adjustment wheels 72a, 72b. A drive wheel angle indicator (not shown) is used to show an operator the angle of drive wheels 50a, 50b. Preferably, angular adjustment of shafts 68a, 68b, and thus drive wheels 50a, 50b, can be made over a range of arc of about five degrees off normal (vertical) to about thirty degrees off normal relative to each other (zero degrees of cant or tilt would provide drive wheels 50a, 50b with parallel, nonconvergent rotational axes). Encreasing the angle of cant or tilt of drive wheels 50a, 50b relative to each other moves the axial convergence point 53 closer to drive wheels 50a, 50b, while decreasing the angle of cant or tilt of drive wheels relative to each other moves axial convergence point 53 away from drive wheels 50a, 50b. The angle adjustment means may allow drive wheels 50a, 50b to be adjusted together or separately. Other standard means for adjusting the angle of drive wheels 50a, 50b and shafts 68a, 68b are also considered to be within the scope of this disclosure.

Figure 4:
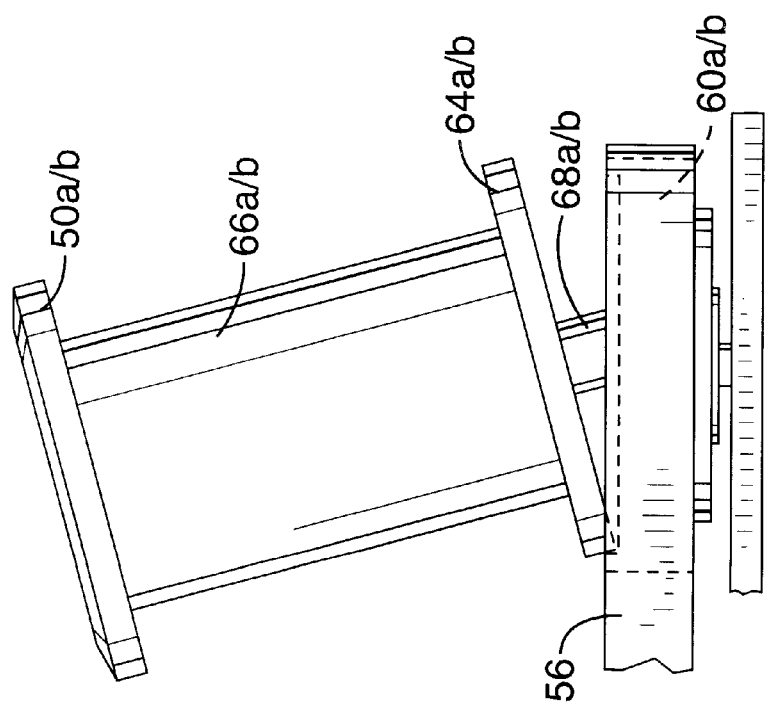
FIG. 4 is a side elevation view of one of the drive wheels shown in FIG. 3 illustrating the tapered, frusto-conical shape of the drive wheel.
Figure 6:
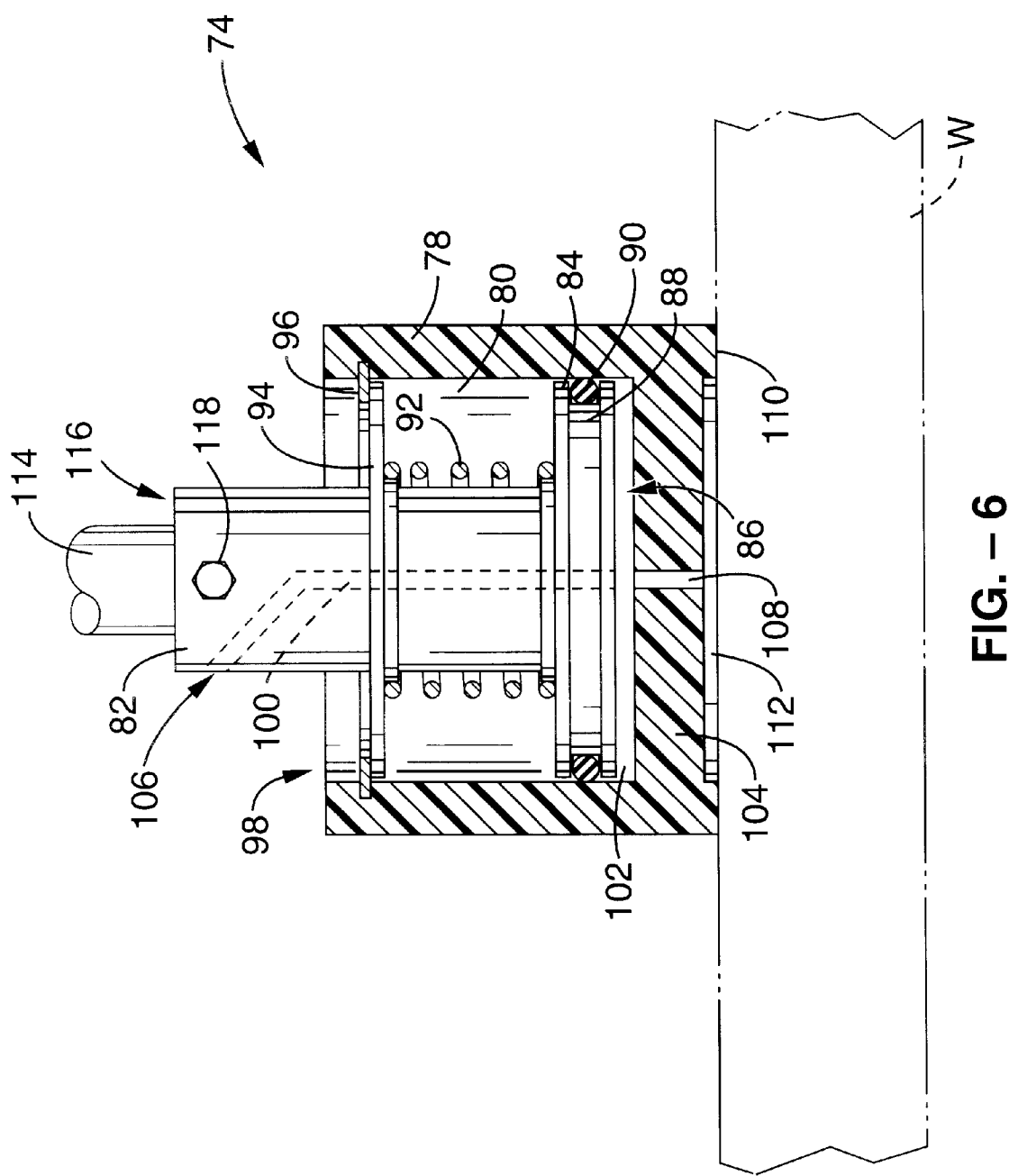
FIG. 6 is a cross-sectional view in detail of the air clamp hold-down assembly shown in FIG. 2 taken through line 6—6.

Referring more particularly to FIG. 4, axially convergent, canted drive wheels or disks 50a, 50b are tapered in shape, and have a generally frusto-conical structure and configuration. The surfaces of drive wheels 50a, 50b are preferably made of or covered with an elastomeric material or otherwise have traction means to allow drive wheels to frictionally engage the lower surface of workpiece W in order to feed workpiece W towards foiling head 20. The elastomeric material additionally avoids scratching or marring of the bottom surface of workpiece W which may have been previously foiled or finished.

The angled arrangement of axially convergent drive wheels 50a, 50b together with their tapered or frusto-conical shape of drive wheels 50a, 50b impart force to workpiece W which has both a rotational component and a radial component, so that both rotational and radial motion is experienced by workpiece W under the action of drive wheels 50a, 50b. Thus, as drive wheels 50a, 50b frictionally engage the bottom surface of workpiece W, workpiece W rotates relative to foiling head 20 so that a new portion of the edge of workpiece W is continuously presented to foiling head. At the same time, the action of drive wheels 50a, 50b pushes workpiece W towards foiling head 20 to provide pressure which, together with heat from oven 24, allow transfer of the decorative coating from foil 30 onto the edges of workpiece W. As mentioned above, the rotational axes of drive wheels 50a, 50b adjust over an angle of arc of approximately five to thirty degrees relative to each other. Generally, a larger angle of tilt is used for edge foiling of smaller workpieces W, while a smaller angle of tilt is used for larger workpieces.

Referring to FIG. 1, FIG. 2, FIG. 6 and FIG. 7, the present invention generally includes hold-down means for holding workpiece W against or adjacent the tilted drive wheels 50a, 50b of the drive means. The hold-down means preferably comprises an air clamp hold-down assembly 74 mounted on a hold-down arm 76. Air clamp hold-down assembly 74 includes a hold-down piston 78 of generally cylindrical structure and configuration, with a hollow interior 80. Located within the interior 80 of hold-down piston 78 is a hold-down tube 82. A disk 84 mounted on the lower end 86 of hold-down tube 82 includes an annular groove or channel 88 which accommodates an O-ring 90. O-ring 90 provides an air-tight seal between hold-down tube 82 and hold-down piston 78. Bias means in the form of spring 92 is included on hold-down tube 82. Spring 92 is positioned between disk 84 and a retaining collar 94 which slidably moves relative to hold-down tube 82. An annular retaining ring or lip 96 extends about the edge of interior 80 of hold-down piston 82 adjacent the open top end 98 of hold-down piston 78, and holds retaining collar 94 and spring 92 within the interior 80 of hold-down piston 78. Hold-down tube 82 includes an internal air channel 100 which communicates with an air chamber 102 located between the lower end 86 of hold-down tube 82 and a bottom wall 104 of hold-down piston 78. A source of pressurized air (not shown) is attached to or communicates with the end 106 of air channel 100. An air bleed hole 108 extends through the bottom wall 104 of hold-down piston 78, and communicates with air chamber 102. A plurality of air bleed holes may be included in bottom wall 104, instead of the single bleed hold 104 shown. A downward facing circular lip or flange 110 extends about the edge of bottom wall 104 of hold-down piston 78, and serves to define a plenum 112 between bottom wall 104 of hold-down piston 78 and the surface of workpiece W.

A mounting rod 114 is attached to the top end 116 of hold-down tube 82 by a bolt 118 or like hardware. Mounting rod 114 is preferably integral to hold-down tube 82. Mounting rod 114 in turn couples to hold-down arm 76. Hold-down arm 76 is movably mounted on base 16 by post 120, and is positionally adjusted by use of indicator plate 122, so that air clamp hold-down assembly 74 can be optimally positioned for particular workpieces W. In operation, pressurized air from air channel 100 pushes hold-down piston 78 down relative to hold-down tube 82. Pressurized air escapes air chamber 102 through bleed hold 108 into plenum 112. The air in plenum 112 forms an air cushion which holds workpiece W against the drive means of the invention. The movement of hold-down piston 78 relative to hold-down tube 82, as well as the size of air chamber 102, will vary with the pressure of air delivered through air channel 100, with retaining collar 98 and retaining ring 96 providing a limit on the amount of movement. The air cushion provided by the air clamp hold-down assembly 74 applies pressure to workpiece W from above without contact between the workpiece W and air clamp hold-down assembly 74, thereby avoiding scratching or marring the upper surface of workpiece W, which may have previously been foiled or finished.

Figure 8:
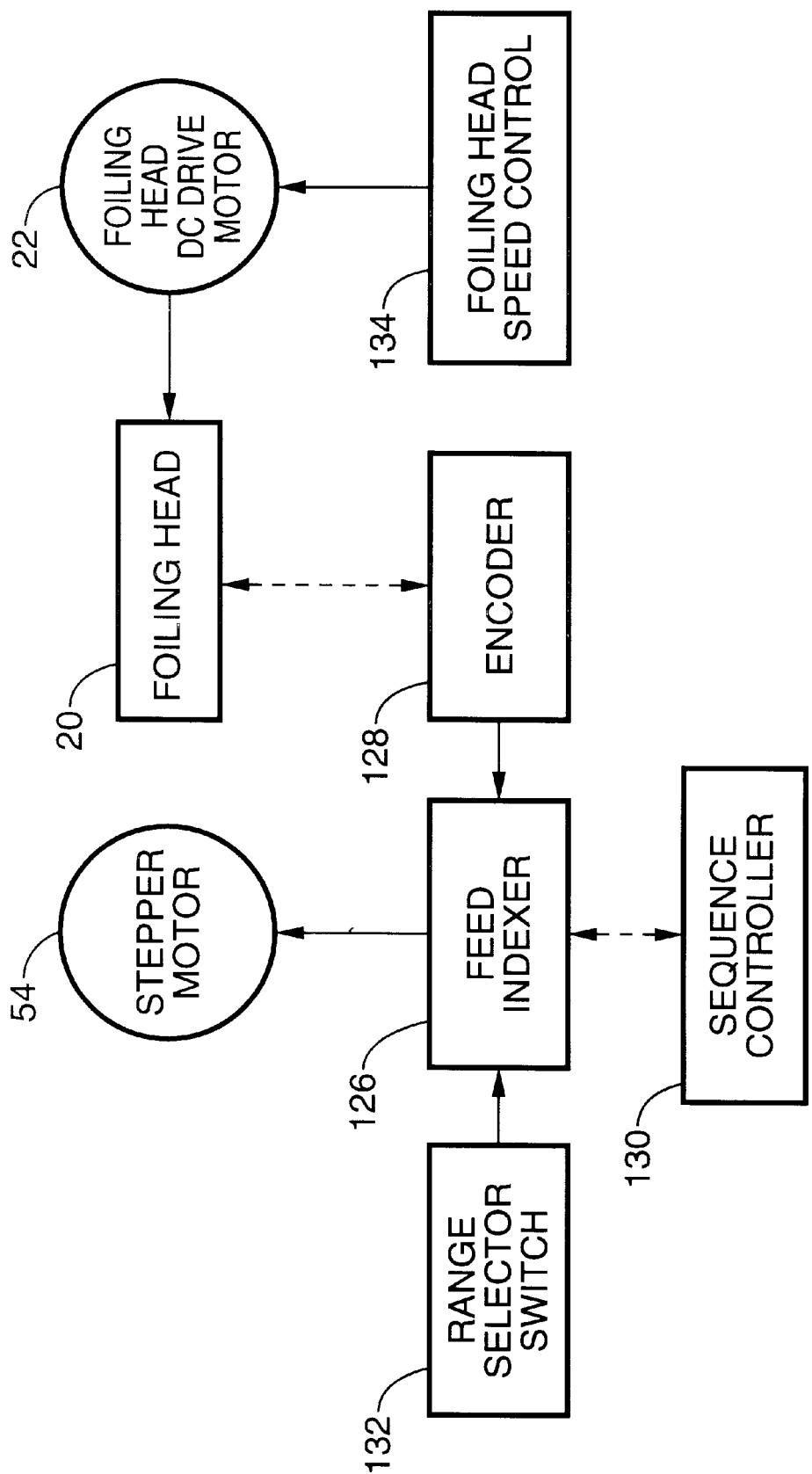
FIG. 8 is a functional block diagram showing generally the speed follower means of the invention.

Means for pushing, moving or sliding the surface finishing means towards the drive means and workpiece are included with the invention, preferably comprising a pneumatic cylinder 124 which is interfaced with movable or to sliding platform 14 by a piston (not shown) or other mechanical interface. Pneumatic cylinder 124 applies pressure to platform 14 to push or slide platform 14 and foil transfer assembly 12 towards drive wheels 50a, 50b and workpiece W. Pneumatic cylinder 124, together with the radial force of drive wheels 50a, 50b, provides pressure between foiling head 20 and workpiece W which is used, together with heat from oven 24, to transfer decorative coating from foil 20 onto workpiece W, as discussed further below. When foiling of a workpiece W is completed, pneumatic cylinder 124 is used to pull or slide foil transfer assembly 12 and platform 14 away from workpiece W. Referring next to FIG. 8, as well as FIG. 1 and FIG. 2, the invention preferably includes speed follower means for controlling the rotational speed of drive wheels 50a, 50b relative to the operating speed of the surface finishing means. The speed follower means utilizes a feed indexer 126 to control the speed of the drive means according to feedback regarding the speed of the surface finishing means. Feed indexer 126 may be a conventional digital or analog computer and may be internal or external to the apparatus 10. Feed indexer 126 is electronically linked with a conventional high resolution encoder 128 or other sensing means which is positioned to monitor the operational rate of the surface finishing means, preferably by monitoring the rotational motion of foiling head 20. Encoder 128 monitors foiling head 20 by tracking the rotational motion of the shaft (not shown connecting foiling head 20 and drive motor 22, or another other rotational part (not shown) associated with foiling head 20. Rotational information regarding the operating speed of foiling head 20 is conveyed to feed indexer 126 from encoder 28 via conventional communication interface. Encoder 128 may be a conventional magnetic, ultrasonic, laser, inductive, audio, rotary optical encoder or optical line follower, high speed thermal sensor, or other means for sensing and detecting the operating speed of foil transfer assembly 12. Feed indexer 126 is interfaced with stepper motor 54, and utilizes input from encoder 128 to calculate a running speed for stepper motor 54 and drive wheels 50a, 50b according to feedback on the rotational speed of foiling head 20 as supplied by encoder 128. Thus, when foiling head 20 overruns to compensate for the shape of the edges of workpiece W, feed indexer 126, which serves as the control and power unit for stepper motor 54, slows down the speed of stepper motor 54 and drive wheels 50a, 50b, to compensate for the overrunning.

A sequence controller 130 and drive speed range selector switch 132 are interfaced with feed indexer 126. The sequence controller 132, which is a conventional digital or analog computer, is electrically isolated through the use of an optical isolator (not shown). Range selector switch 132 preferably has a range of six speeds for stepper motor 54. A variable foil speed control 134 is used to set the rotational speed of foiling head drive motor 22 and foiling head or wheel 20. Feed indexer 126, sequence controller 130, range selector switch 132 and foiling head speed control 134 are preferably included on control panels 138, 140 or are internal to base 16 and have displays associated with control panels 136, 138, to facilitate use of the invention.

An inverse relationship is preferably used by feed indexer 124 so that, as the speed of foiling head 20 increases due to overrunning, a feedback loop slows the speed of stepper motor 54 and thus drive wheels 50a, 50b. Changes in rotational speed of foiling head 20 are detected and monitored by encoder 128, and communicated to feed indexer 126 as described above. Open control programming associated with feed indexer 124 calculates running speeds for stepper motor 54 in inverse relation to the speed of foiling head drive motor 22 and foiling head 20. The speed follower means of the invention thus slows down stepper motor 54 and drive wheels 50a, 50b when the speed of foiling head 20 increases, accelerates or overruns due to the uneven shape of the edges of workpiece W, thereby reducing the rotational speed of workpiece W in response to the overrunning and avoiding uneven or inaccurate application of decorative coating from foil 30 to the edges of workpiece W which could otherwise occur. The speed follower means of the invention thus provides a constant peripheral or edge speed for workpiece W by slowing down or speeding up the drive means as required to compensate for uneven or irregular edge shapes.

The open control programming of the speed follower means can include a fuzzy logic algorithm tree which utilizes a conversion ratio, along with the clocked speed differential of encoder 126, to calculate the running speed values for stepper motor 54. The structure of the open control programming preferably allows for many speed ranges and control behaviors, and allows accommodation of different sizes of foiling wheels, different types of foiling such as ultrasonic and vibratory foiling, and different surface finishing means generally, including spray paint applicators, computer controlled spray paint applicators, surface planers, sanders, buffers, polishers, or other surface finishing or surface treating means. The fuzzy logic algorithm may operate in real time for calculating the speed band width without feedback ramping and runaway conditions. Those skilled in the art will appreciate that conventional programming techniques may be used to implement the foregoing method in software or hardware equivalents. It should also be understood that the invention may be utilized without the speed follower means, if desired, particularly when used for foiling workpieces having edges with gently curved and regular shapes.

Control panels 136, 138, shown in FIG. 1 and FIG. 2, include several control buttons, keys knobs, switches, LED and/or liquid crystal displays, and to other standard user or operator interface items for control of the surface finishing apparatus 10. In the preferred embodiment, control panel 136 includes an emergency stop button 140, drive speed range selector/control switch 132, foil speed control 134, temperature controller 142 and temperature display 144 for swivel oven 24, an unwind torque control 146 for unwind motor 28, rewind torque control 148 for uptake motor 32, start/stop buttons 150 for stepper motor 54, start/stop buttons 152 for foiling head drive motor 22 and foiling head 20, start/stop buttons 154 for uptake motor 32 and unwind motor 28, and on/off buttons 156 for swivel oven 24. Control panel 140 is shown as including an on/off switch 158 for providing pressurized air to air clamp assembly 74, an on/off switch 160 for activating pneumatic cylinder, a pressure gauge 162 for air clamp assembly 74, a pressure gauge 164 for pneumatic cylinder 124, a pressure control valve 166 for air clamp assembly 74, and a pressure control valve 168 for pneumatic cylinder 124. The location and arrangement of the controls, buttons, switches, knobs and displays as shown are merely one possible arrangement which is convenient for persons operating the apparatus 10, and other control panel arrangements may alternatively be used.

The surface finishing apparatus 10 is utilized by positionally adjusting hold-down arm 76 and adjusting the length and angle of swing of jockey arm 38 according to the dimensions of workpiece W. A stop roller 170 for workpiece W is also positionally adjusted, according to the size and shape of workpiece W, by moving indicator plate 172 on bolt 174. Emergency stop switch or button 140 is activated, and the power to apparatus 10 is turned on, enabling sequence controller 130. The uptake/unwind motor switch 154 is activated, and a foil spool 26 is loaded onto unwind motor 28. The foil 30 is fed through guide wheel assembly 44, around foiling head or wheel 20, roller 42 on jockey arm 38, and pulley 36 on rewind arm 34, and then connected with uptake motor 32. The unwind torque control 146 and rewind torque control 148 are adjusted tension foil 30. The start/stop button 152 for foiling head drive motor 22 and foiling head 20 is then activated, to start rotation of foiling head 20. The foiling head speed control 134 is then adjusted to a desired speed, which sets the speed range of foiling head drive motor 22 and foiling head 20. The oven on/off switch 156 is activated to heat foiling head 20, and temperature control 142 is used to set the temperature of oven 24. A workpiece W is placed on ball bearing rows 18a–18d on base 16, and the on/off switch 160 for the air clamp hold-down assembly is activated. As mentioned above, the number and configuration of ball bearing rows 18a–18d may be varied to accommodate different workpieces. Control valve 166 is used to regulate pressurized air for air clamp hold-down assembly 74. The angle of axially convergent drive wheels 50a, 50b is set by adjustment wheels 72a, 72b, the drive motor switch 150 is activated, and drive speed range selector switch is used to set a base drive speed for stepper motor 54 and drive wheels 50a. 50b. The on/off switch 158 for pneumatic cylinder 124 is activated to move or slide platform 14 and foil transfer assembly 12 towards workpiece W, and control valve 164 is used to adjust the pressure applied by pneumatic cylinder 124 on platform 14.

During operation, the axially convergent, canted relationship of drive wheels 50a, 50b provide a feeding or drive action which rotates workpiece W as well as pushes workpiece W against rotating foiling head 20. At the same time, pneumatic cylinder 124 pushes foiling head 20 against workpiece W. Heat from oven 24 heats foiling head 20 and foil 30 as foil passes around foiling head 20, and the combined heat and pressure effect a transfer of heat-activated paint or decorative coating from foil 30 to the edges of workpiece W. Foil 30 is continuously unwound from spool 26, to supply fresh foil 30 to foiling head 20. Jockey arm 38 pivotally moves as required by the shape of workpiece W. Oven 24 likewise can pivot or swivel to accommodate workpiece W. After transfer of the decorative coating to workpiece W, the used carrier film is stripped off the edge of workpiece W and wound up by uptake motor. When all the edges of workpiece W have been foiled, pneumatic cylinder switch 158 is turned off and drive motor switch 150 is turned off, to stop motion of workpiece W and separate foiling head 20 from workpiece W. The air clamp hold-down pressure switch 160 is then turned off to release the workpiece W, allowing exchanged with a new unfinished workpiece, for which the above procedure is repeated.

The action of axially convergent, canted drive wheels 50a, 50b, which both rotate workpiece W as well as provide a radial force to the workpiece W to press workpiece W against foiling head, supplies the motion and pressure to workpiece W needed for foiling without the use of a template or other guide structure required by currently used foiling devices. The air clamp hold-down assembly 74 applies pressure to workpiece W and holds workpiece W against drive wheels 50a, 50b without contacting the top surface of workpiece W, and thus eliminates the danger of scratching or marring of the flat top surface of workpiece W during edge foiling. The speed follower means slows down the stepper motor 54 and drive wheels 50a, 50b when the speed of foiling head 20 increases, accelerates or overruns due to the uneven shape of the edge of workpiece W, reducing the rotational speed of workpiece W and avoiding cracking, crinkling or otherwise uneven or inaccurate application of decorative coating from foil 30 to the edges of workpiece W. Conventional foiling devices do not provide for control of drive speed relative to foiling speed, and thus previous foiling devices have not been able to effectively foil odd-shaped and curvilinear shaped boards, as is done by the present invention.

Figure 7:
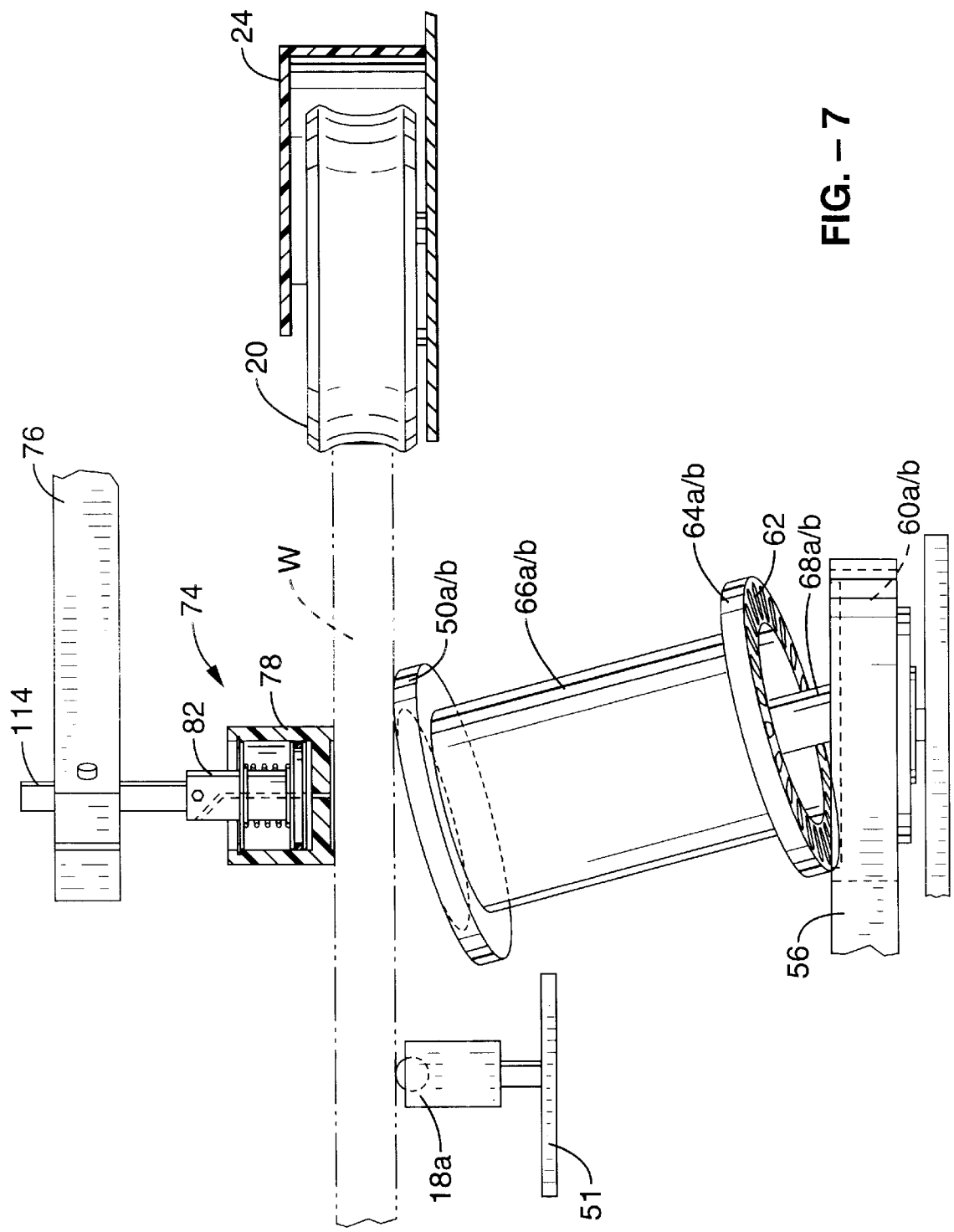
FIG. 7 is a side elevation view of a drive wheel, an air clamp hold-down assembly in cross-section, a hold-down arm, a foiling head, a portion of the base and a ball bearing row, and a workpiece W shown in phantom.
Figure 9:
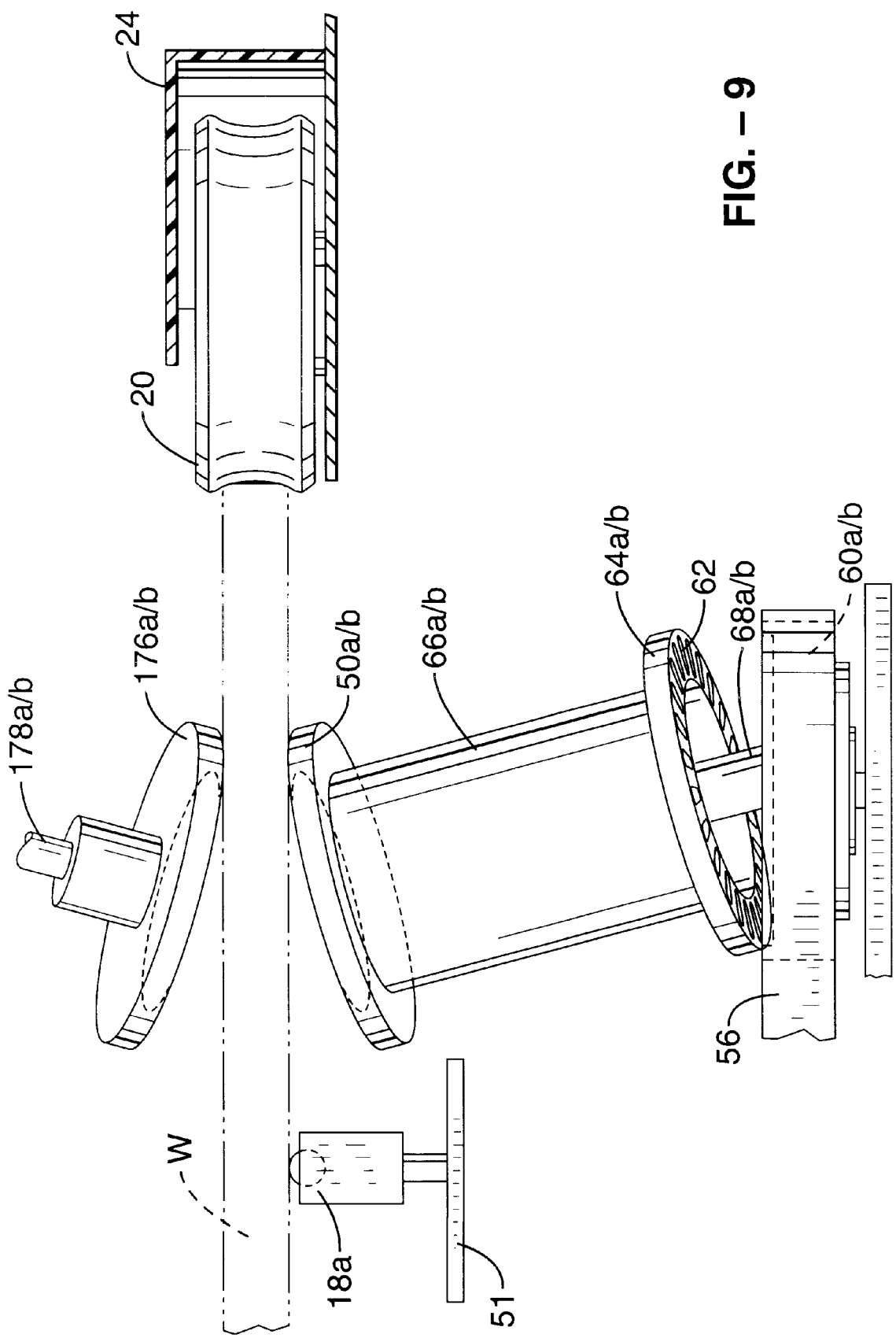
FIG. 9 is a side elevation view of a drive wheel shown with an upper hold-down wheel and foiling head, together with a portion of the base and a ball bearing row, and a workpiece W shown in phantom.

Referring now to FIG. 9, an alternative embodiment of the hold-down means of the invention is shown as a pair of axially convergent hold wheels 176a, 176b which are positioned above and opposite the pair of axially convergent drive wheels 50a, 50b of the drive means, with one hold-down wheel 176a, 176b positioned adjacent each drive wheel 50a, 50b. For reasons of clarity, only one of the pair of hold-down wheels 176a, 176b is shown in FIG. 7. Hold-down wheels 176a, 176b are generally tilted or canted relative to each other, and are positioned in a mirror image relationship through a horizontal plane of reflection. The rotational axes (not shown) of hold-down wheels 176a, 176b have a convergence point (not shown) due to the canted or tilted relationship of hold-down wheels 176a, 176b, in a manner similar to that described above for drive wheels 50a, 50b. The angle of tilt of hold-down wheels 176a, 176b generally matches the angle of tilt of drive wheels 50a, 50b relative to workpiece W. Hold-down wheels 176a, 176b are tapered in shape, have a frusto-conical structure and configuration, and preferably have traction generating means such as an elastomeric layer or coating which frictionally interacts with the upper surface of workpiece W. Hold-down wheels 176a, 176b are spaced apart from tilted drive wheels 50a, 50b to accommodate workpiece W between hold-down wheels 176a, 176b and drive wheels 50a, 50b. Vertical positioning means (not shown) allow hold-down wheels 176a, 176b to be vertical positioned relative to drive wheels 50a, 50b, to accommodate workpieces of different thickness.

Hold-down wheels 176a, 176b are mounted on angled shafts 178a, 178b, and are adjusted in angle to control the point of convergence of the rotational axes of hold-down wheels 176a, 176b, and to match the angle of tilt of drive wheels 50a, 50b. Angle adjustment means for hold-down wheels 176a, 176b is preferably provided by hand operated adjustment wheels 72a, 72b, which are mechanically interfaced via conventional means (not shown) to angled shafts 178a, 178b through use of mounting bases (not shown), angle clamps (not shown). Thus, angular adjustment of drive wheels 50a, 50b and hold-down wheels 176a, 176b are preferably made at the same time, by the same mechanism described above for angular adjustment of drive wheels 50a, 50b. Alternatively, separate or independent angle adjustment means may be used for hold-down wheels 176a, 176b and angled shafts 178a, 178b. Angular adjustment of shafts 178a, 178b and hold-down wheels 176a, 176b are preferably made over a range of arc of about five degrees to about thirty degrees and match (in mirror image) the angle of drive wheels 50a, 50b.

The drive means of the invention is preferably used to impart rotational power to hold-down wheels 176a, 176b, and stepper motor 54 is mechanically interfaced with hold-down wheels 176a, 176b through use of a timing belt, cogged timing pulleys, and cogged wheels (not shown) which are similar to those described above for drive assembly 46. Thus, the frusto-conical shape and angle or tilt of hold-down wheels 176a, 176b provides rotational motion and radial force to workpiece W in the same manner as drive wheels 50a, 50b. Since the hold-down wheels 176a, 176b are powered by stepper motor 54, the speed follower means of the invention slows down hold-down wheels 176a, 176b, as well as drive wheels 50a, 50b, when the speed of foiling head 20 increases or accelerates due to the shape of the edge of workpiece W. A separate drive assembly and speed follower means could alternatively be employed for hold-down wheels 176a, 176b.

Use of the invention with the hold-down wheels 176a, 176b shown in FIG. 7 would be carried out in generally the same manner as described above, but without the use of air clamp hold-down assembly 74 and hold-down arm 76, since hold-down wheels 76 provide the hold-down means. The elastomeric layer or coating on hold-down wheels 176a, 176b prevents marring or scratching of the top surface of workpiece W.

Referring next to FIG. 10 an alternative embodiment of the drive means of the invention is generally shown as drive arrangement 180. Drive arrangement 180 includes axially convergent or canted drive wheels 182a, 182b which have rotational axes 184a, 184b that meet or converge at a convergence point 186. In the drive arrangement 180, drive wheels 182a, 182b are structured, configured and positioned such that rotational axes 184a, 184b lie in a plane which is generally parallel to the plane defined by the workpiece (not shown). Thus, rotational axes 184a, 184b of drive wheels 182a, 182b are substantially perpendicular to the rotational axes 52a, 52b of drive wheels 50a, 50b in the embodiment of drive arrangement 46 described above. Conventional right angle gear arrangements 188a, 188b are used with drive arrangement 180 to mechanically interface drive wheels 182a, 182b with a rotational power source such as a stepper motor (not shown) or like motor which has a rotational axis that is generally perpendicular to rotational axes 184a, 184b. Alternatively, a stepper motor may be positioned such that its rotational axis lies in a plane which is generally parallel to the plane defined by rotational axes 184a, 184b, in which case a cogged timing pulley and wheel arrangement of the type described above may be used with drive arrangement 180.

Referring also to FIG. 1 and FIG. 2, drive arrangement 180 may be substituted in well 48 for drive arrangement 46, and be used in a manner which is generally the same as described above for drive arrangement 46. As with drive wheels 50a, 50b, the axially convergent or canted relationship of drive wheels 182a, 182b serves to provide both rotational motion and radial motion to the workpiece during surface finishing operations. Drive arrangement 180 illustrates that the axially convergent nature of the drive wheels of the invention provides the means for imparting rotational and radial force to the workpiece, and that the angular relationship of the drive wheels and their rotational axes may be varied with respect to the workpiece and the rotational axis of the foiling head while providing rotational and radial force to the workpiece. Thus, the axially convergent drive wheels of the invention may be structured and configured such that their rotational axes lie within a plane which is substantially canted relative to the plane of workpiece W, as shown for drive wheels 50a, 50b above, or the rotational axes may lie within a plane which is substantially parallel to the plane defined by workpiece W, as shown for drive wheels 182a, 182b.

Accordingly, it will be seen that this invention provides a surface finishing apparatus which allows edge foiling of curvilinear-shaped boards, which does not mar or scratch previously finished surfaces during edge foiling, which utilizes a pair of tilted drive wheels of tapered shape for simultaneously imparting rotational and radial force to a workpiece, and which utilizes speed follower control means so that the running speed of the drive wheels is inversely related to the foiling head speed. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A surface finishing apparatus, comprising:
   (a) a pair of axially convergent drive wheels;
   (b) hold-down means for holding a workpiece against said drive wheels;
   (c) means for finishing the surfaces of a workpiece;
   (d) means for adjusting the angle of the rotational axes of said drive wheels relative to each other; and
   (e) speed follower means for controlling the rotational speed of said drive wheels in response to the operating speed of said surface finishing means.

2. An apparatus as recited in claim 1, further comprising means for moving said surface finishing means towards said pair of axially convergent drive wheels.

3. An apparatus as recited in claim 1, wherein said axially convergent drive wheels have rotational axes which are substantially canted relative to the plane defined by a workpiece.

4. An apparatus as recited in claim 1, wherein said axially convergent drive wheels have rotational axes defining a plane which is substantially parallel to the plane defined by a workpiece.

5. An apparatus as recited in claim 1, further comprising means for imparting rotational power to said pair of axially convergent drive wheels.

6. An apparatus as recited in claim 1, wherein said speed follower means comprises:
   (a) a feed indexer, said feed indexer interfaced with said pair of axially convergent drive wheels and said surface finishing means;
   (b) an encoder, said encoder positioned to monitor said operating speed of said surface finishing means, said encoder interfaced with an indexer computer; and
   (c) said feed indexer including means for controlling said rotational speed of said axially convergent drive wheels in response to changes in said operating speed of said surface finishing means.

7. An apparatus as recited in claim 1, wherein each said axially convergent drive wheel has a tapered shape.

8. A speed follower for use with a surface finishing machine having a drive assembly and a surface finishing assembly, said speed follower comprising:
   (a) a feed indexer, said feed indexer interfaced with said drive assembly; and
   (b) means for sensing the operating speed of said surface finishing assembly, said sensing means interfaced with said feed indexer;
   (c) said feed indexer including means for controlling the operating speed of said drive assembly in response to sensed changes in said operating speed of said surface finishing assembly;
   (d) wherein said feed indexer includes open control programming, said programming performing the operation of calculating said operating speed for said drive assembly in response to said sensed operating speed of said surface finishing assembly, said operating speed for said drive assembly inversely related to said sensed operating speed of said surface finishing assembly.

9. A speed follower as recited in claim 8, wherein said sensing means comprises a high resolution rotational encoder, said encoder positioned to monitor rotational movement of a rotating part associated with said surface finishing assembly.

10. A speed follower as recited in claim 2, wherein said programming includes a fuzzy logic algorithm tree, said fuzzy logic algorithm tree utilizing a conversion ratio and the clocked speed differential of said encoder to perform said operation of calculating said operating speed for said drive assembly.

11. A speed follower for use with a surface finishing machine having a drive assembly and a surface finishing assembly, said speed follower comprising:
   (a) a feed indexer, said feed indexer interfaced with said drive assembly; and
   (b) means for sensing the operating speed of said surface finishing assembly, said sensing means interfaced with said feed indexer, said sensing means comprising a high resolution rotational encoder positioned to monitor rotational movement of a rotating part associated with said surface finishing assembly;
   (c) said feed indexer including means for controlling the operating speed of said drive assembly in response to sensed changes in said operating speed of said surface finishing assembly.

12. A speed follower as recited in claim 11, wherein said feed indexer includes open control programming, said programming performing the operation of calculating said operating speed for said drive assembly in response to said sensed operating speed of said surface finishing assembly, said operating speed for said drive assembly inversely related to said sensed operating speed of said surface finishing assembly.

13. A speed follower as recited in claim 11, wherein said operating speed of said drive assembly is controlled to be inversely related to said operating speed of said surface finishing assembly.

* * * * *

UNITED STATES PATENT AND TRADEMARK OFFICE
CERTIFICATE OF CORRECTION

PATENT NO. : 5,954,915  
DATED : December 18, 2000  
INVENTOR(S) : Theodore Voorhees, William W. Bollinger and Paul L. McDowell Page 1 of 1

It is certified that error appears in the above-identified patent and that said Letters Patent is hereby corrected as shown below:

Column 1,  
Line 13, change "OMF" to -- MDF --

Column 2,  
Line 12, change "comers" to -- corners --  
Line 22, change "MDJF" to -- MDF --

Column 6,  
Line 20, delete "is" second occurrence  
Line 28, after "orientation" delete comma ","

Column 8,  
Line 11, change "fom" to -- from --  
Line 44, change "Encreasing" to -- Increasing --

Column 9,  
Line 39, change "Intermal" to -- Internal --

Column 10,  
Line 11, delete "to"

Signed and Sealed this

Twenty-first Day of June, 2005

JON W. DUDAS  
*Director of the United States Patent and Trademark Office*